Figure 1:
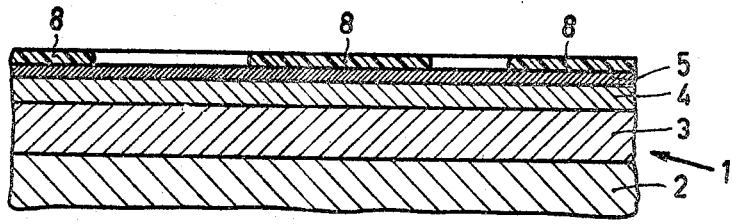

Jan. 20, 1970     R. DE WERDT     3,490,943
METHOD OF FORMING JUXTAPOSED METAL LAYERS SEPARATED BY
A NARROW GAP ON A SUBSTRATE AND OBJECTS MANUFACTURED
BY THE USE OF SUCH METHODS
Filed April 16, 1965     6 Sheets-Sheet 1

INVENTOR.
REINIER DE WERDT
BY
AGENT

INVENTOR.
REINIER DE WERDT
BY
AGENT

INVENTOR.
REINIER DE WERDT
BY
AGENT

Jan. 20, 1970 R. DE WERDT 3,490,943
METHOD OF FORMING JUXTAPOSED METAL LAYERS SEPARATED BY
A NARROW GAP ON A SUBSTRATE AND OBJECTS MANUFACTURED
BY THE USE OF SUCH METHODS
Filed April 16, 1965 6 Sheets-Sheet 6

*INVENTOR.*
REINIER DE WERDT
BY

*AGENT*

United States Patent Office 3,490,943
Patented Jan. 20, 1970

3,490,943
METHOD OF FORMING JUXTAPOSED METAL LAYERS SEPARATED BY A NARROW GAP ON A SUBSTRATE AND OBJECTS MANUFACTURED BY THE USE OF SUCH METHODS
Reinier de Werdt, Emmasingel, Eindhoven, Netherlands, assignor, by mesne assignments, to U.S. Philips Corporation, New York, N.Y., a corporation of Delaware
Filed Apr. 16, 1965, Ser. No. 448,741
Claims priority, application Netherlands, Apr. 21, 1964, 6404321
Int. Cl. B32b 15/04; C23f 1/02
U.S. Cl. 117—212                                                           12 Claims The invention relates to methods of forming juxtaposed metal layers separated by a narrow gap on a substrate of material other than that or those of the layers and to objects manufactured by the use of such methods. Whenever in this specification reference is made to a material other than that or those of the layers, it is to be understood that this material is not a material which differs from the material of one or both layers only with regard to small additions of impurities. The formation of such layers separated by a narrow gap is used for many purposes, for example, in semiconductor techniques especially in cases where microminiaturisation is an important subject. The dimensions of the gaps are in many cases determinative of the operation of the semiconductor device. In photo-electric cells, for example, the width of the gap between the two metal layers serving as electrodes determines the sensitivity whereas, for example, in field-effect transistors the width of the gap between the source and drain electrodes is determinative of the gain factor and the frequency range. Such small gaps are often also desirable for the electrical insulation between two metal layers, for example in field-effect transistors in which the gate electrode layer must be formed, for example, between the source and drain electrode layers on one side of a carrier and in which this gate electrode layer must be separated from the other electrodes, for example, by small gaps. In high frequency transistors having juxtaposed metal contact layers for the base and the emitter, it is important for a low resistance of the base that the metal contact layer for the base lies as close as possible to the emitter-base junction, while for a satisfactorily acting emitter it is advantageous that the metal contact layer of the emitter covers substantially the whole surface area of the emitter zone of the semiconductor. While in the above-mentioned cases there is aimed, on the one hand, at a gap between the metal layers which is as narrow as possible, this gap must, on the other hand, be large enough to prevent any short circuit between the layers. For this reason also it is important that the distance between the metal layers is substantially constant throughout the length of the narrow gap.

It is common practice to apply such metal layers, which often constitute complicated patterns, by evaporation or by using photographic or galvanic techniques to a substrate with the aid of local masks. In practice, each metal layer is usually formed separately whereby it is necessary to mask twice. In order to obtain very small gaps between two metal layers, more particularly less than 10 microns, for example, a few microns, the two masks must be matched to each other very accurately and the second mask must be positioned very accurately with respect to the first, thus rendering this method complicated.

An object of the invention is to provide a method of the kind mentioned in the preamble which does not have the above-mentioned disadvantages. The method according to the invention is characterized in that one of the two metal layers is first formed on the substrate and then covered with an etch-resistant masking material according to the pattern of the layer to be ultimately manufactured, after which the layer is subjected to an etching treatment whereby any unmasked portions of the layer are removed, the etching treatment being continued until along the edge of the mask a narrow strip of the layer beneath the masking material is also removed, after which the second metal layer is formed, by using the shadowing action of the masking material, on at least a portion of the surface of the substrate next to the said edge which is not overlapped by the masking material. The substrate may consist of a semiconductor material. It may, however, also consist of another material, for example, an insulating material. For manufacturing a semiconductor device it is possible in the latter case to apply a semiconductor material after the two metal layers have been formed.

The invention is not limited, however, to the manufacture of semiconductor devices. Another possible application may, for example, be the manufacture of very narrow optical slits by forming two metal layers on a transparent carrier, for example of glass, by the method according to the invention.

In the manufacture of so called "printed wirings" or printed circuits it is often desirable to form very narrow metal strips, possibly of complicated shape, on a carrier. The method according to the invention permits of manufacturing for this purpose photomasks with a slot between two metal layers said slot having a shape and width as desired for the printed wiring, the layers being formed on a transparent substrate. Very narrow metal strips of uniform width may be formed on a substrate with the aid of such a photomask by using known photographic techniques and, for example, a photo-sensitive lacquer (photo-resist).

It is to be noted that it is known per se to form a rectifying electrode on a semiconductor body by alloying on it a pellet, then etching beneath the pellet a groove in the semiconductor body by using an electrolytic etching process and giving the alloy pellet a suitable biassing potential, followed by evaporation-deposition of a metal. The alloy-pellet thus acts as a shadowing mask so that the layer deposited on the semiconductor surface does not extend into the groove beneath the alloy pellet and does not shortcircuit the pn-junction. Instead of using an electrolytic etching treatment, the groove may be formed by chemical etching, in which even the semiconductor material is etched away more strongly at the pn-junction than the remaining material of the semiconductor body. For the manufacture of high frequency transistors in which a thin metal layer is used instead of an alloyed pellet, this method would, as a rule, not be particularly suitable since the second metal deposited may penetrate into the first metal layer and possibly even to the junction between this layer and the semiconductor material so that the properties of this junction may be detrimentally affected. Furthermore, after the layers are formed, it is often desirable to use a thermal treatment for obtaining a satisfactorily adhering contact of low transition resistance with the substrate, but during this treatment the material of the layer first provided is liable to fuse and its contact with the substrate may be poisoned by the material of the second layer deposited onto the first layer. Further such a metal layer is used in transistors of the type having an extremely thin base zone. The etching of a groove as suggested when using an alloy pellet is difficult to carry out in such cases without a risk of the base zone being etched through up to the collector zone. In electrolytic etching it is also necessary to apply a biassing potential to the alloy pellet, thus necessitating the formation of an electrical connection on the pellet. In ultra-high frequency transistors having metallically conductive electrode layers there is aimed at emitters having very small dimensions at least in the direction of width. The forming of a temporary connection to such a layer is complicated, however, whereas the presence of a permanent contact is troublesome during the evaporation of a second layer since even the surface portions to be covered with this metal layer may be locally shaded.

Further a method of manufacturing a high frequency npn-type transistor has been suggested which utilizes an n-type silicon body in which an emitter zone and a base zone located one below the other are formed by diffusion of an acceptor and a donor. A thin $SiO_2$ layer is formed on the emitter zone and then partly etched away by photographic means. Subsequently the n-type conductive emitter zone is etched away by using the remaining oxide layer as a mask, not only the portions next to this mask being removed but also a strip beneath the oxide mask along the edge thereof. Next a metallic base contact layer is applied by evaporation using the shadow action of the $SiO_2$ layer so that the remaining emitter zone at its junction with the base zone are not covered, but the base contact yet comes to lie close to the pn-junction. Part of the remaining emitter zone is covered with an evaporation-deposited metal emitter-contact layer by using a second mask and removing the remaining oxide layer wholly or in part. Although the base-contact layer can thus be formed close to the pn-junction between the emitter and the base, the aforementioned disadvantages inherent in the use of a second mask are not eliminated. Further in this case also the disadvantage is involved that the semiconductor material itself must be etched away. The difficulty then arises that, on the one hand, the underetching process must be continued so long that the pn-junction, which lies at a small depth, must be sufficiently overshadowed by the masking silicon layer at the area where the pn-junction is exposed after etching, while on the other hand the very thin base layer must not be etched through.

The semiconductor technique often uses extremely thin metal layers, for example, thinner than 1 micron. When using the method according to the invention such layers may be readily etched away without a risk of the substrate being attacked to any appreciable extent. The mask then remains along its edge at a very small distance from the substrate.

Since the material of the first metal layer differs from that of the substrate, it is possible to choose an etchant which does not substantially attack the substrate or at least to a much lesser extent than the material of the said metal layer. With a given choice of the materials for the metal layer and the substrate the known etchants generally provide adequate possibilities for finding and using such a selectively acting etchant. If desired, a surface zone of the substrate next to the remaining first metal layer may be etched away by choosing an etchant which acts upon both materials, for example, in the event of the substrate consisting of semiconductor material having a surface zone of a conductivity type opposite to that of the adjacent underlying semiconducor material. However, in this case, preferably first an etchant is used which can selectively dissolve the material of the metal layer and then an etchant is used which can etch away the material of the substrate. In fact, after the metal layer beneath a marginal zone of the mask has been etched away during the first etching treatment, the second etchant can directly act on that surface area of the substrate which is overshadowed by the mask. It is thus in practice not necessary to etch away material from the zone located beneath the thin zone, while it can yet be achieved that the area where the pn-junction is exposed after etching is sufficiently overshadowed by the mask.

The etch-resistant mask may be formed by photographic means. To this end, an etch-resistant lacquer may be used having the property of being soluble in a given solvent but insoluble in this solvent after irradiation with, for example, ultra-violet light. It is also possible to choose an etch-resistant lacquer which is insoluble in a given solvent but which becomes soluble in this solvent after irradiation, for example, with ultra-violet light. Both kinds of such photosensitive lacquers, also referred to as "photoresist," are known and commercially available. As is well known, such photoresists, which are organic film emulsions, are electrical insulators.

The compositions of the two metal layers may be chosen according to the desired properties of the device to be manufactured. They may be chosen equal or different. As far as the practicability of the method for the accurate positioning of the two layers is concerned, the majority of metals and alloys are usable. As to the choice of the material for the second layer it is preferable to use a material which can be deposited by evaporation, although in this case also other methods may be used, for example, spraying or smearing on the substrate compounds of metals, if desired in the form of a suspension, which can be converted into the metals of the layer, for example, by heating. For the choice of the material for the first layer it is only required that the layer can be etched away. Even a noble metal, such as gold, can be removed by etching and in that case one is not confined to the use of the aqua regia (a mixture of concentrated hydrochloric acid and concentrated nitric acid), which also strongly acts on many other materials, but rather a more selective etchant can be used, such as an aqueous solution of potassium cyanide and hydrogen peroxide. The latter solution is also suitable, for example, for etching silver and copper. Copper, silver and gold are, for example, suitable electrode materials for semiconductor devices with semiconductor material of cadmium sulphide which is substantially not attacked by the last mentioned etchant. Cadmium sulphide is used inter alia in photo-electric cells and field-effect transistors. As previously mentioned, metal layers separated by a narrow intermediate space of constant width are very advantageous in such devices.

For the manufacture of semiconductor devices one metal layer may consist of a material which, after a suitable thermal treatment during which at least one donor or acceptor is incorporated from the material of this layer into the adjacent semiconductor material, for example, by alloying and recrystallisation of the semiconductor material, by diffusion or by both of them, can locally induce in the semiconductor material a conductivity type opposite to that of the semiconductor material adjacent the other metal layer.

Initially a semiconductor material may be adjacent the first mentioned metal layer which has a conductivity type equal to that of the material adjacent the other metal layer. By means of a suitable thermal treatment a zone of the semiconductor material adjacent the first mentioned metal layer is then formed having a conductivity type which is opposite to that of the semiconductor material initially adjacent the said metal layer. A pn-junction is thus formed which is exposed in the narrow gap between the two metal layers. An emitter and a base contact may thus be formed, for example, on a base zone of a transistor. If a pn-junction is already exposed prior to the formation of the first mentioned metal layer and if said metal layer is intended as an ohmic contact on one of the two parts of the semiconductor body on either sides of the pn-junction it is permissible that the relevant metal layer, when applied, covers the pn-junction since by using the required thermal treatment a thin zone is formed which constitutes a pn-junction with the adjacent zone of the semiconductor, thus preventing short-circuit of the pn-junction. It is therefore not necessary for the mask used for forming the two metal layers to be carefully matched to the original location of the pn-junction.

In the cases described in the previous paragraph it is, of course, also possible to use materials for the two metal layers, which, when subjected to a suitable thermal treatment, can induce given conductivity types in the adjacent semiconductor material and this preferably so that the material of one layer induces a conductivity type which is opposite to that induced by the material of the other layer. If at least one donor is used in one of the two layers, then at least one acceptor is used in the other layer.

In order that the invention may be readily carried into effect, it will now be described in detail, by way of example, with reference to the accompanying diagrammatic drawings showing the manufacturing stages of an npn-transistor and of a field-effect transistor.

Figure 2:
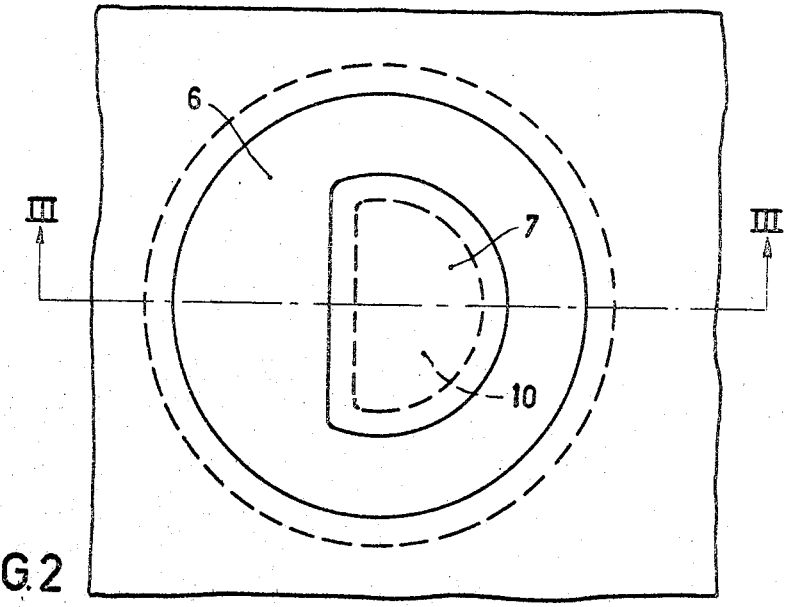
Figure 5:
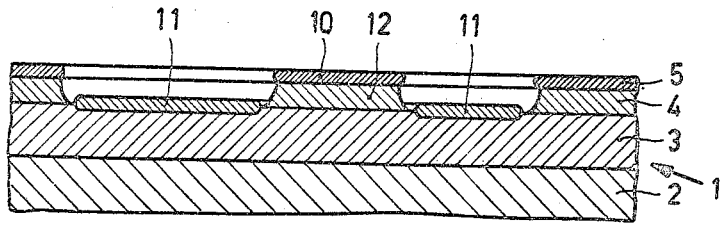
Figure 6:
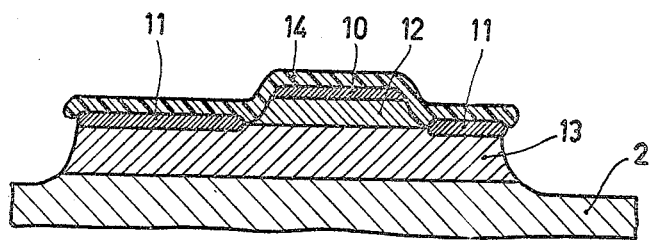
Figure 7:
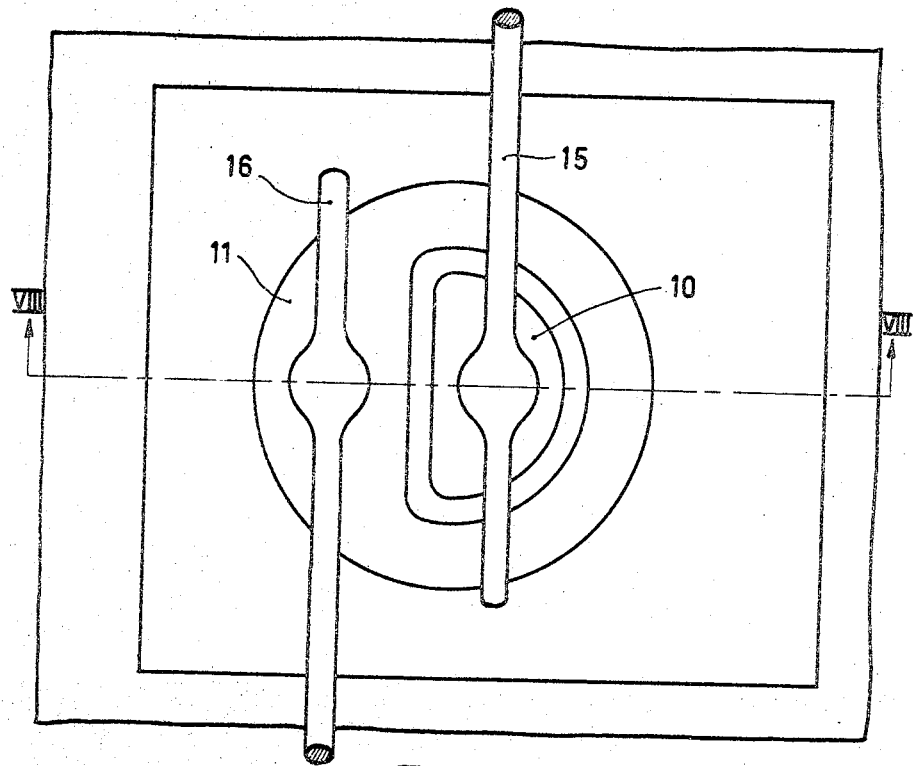

FIGURES 2 and 7 show portions of a plan view and FIGURES 1, 3–6 and 8 show portions of a vertical cross section of the transistor at various stages of its manufacture, taken on the lines III—III and VIII—VIII of FIGURES 2 and 7 respectively.

Figure 12:
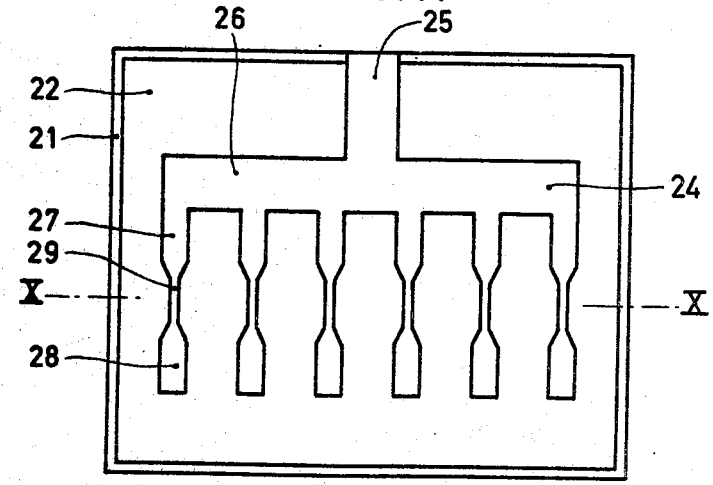
Figure 14:
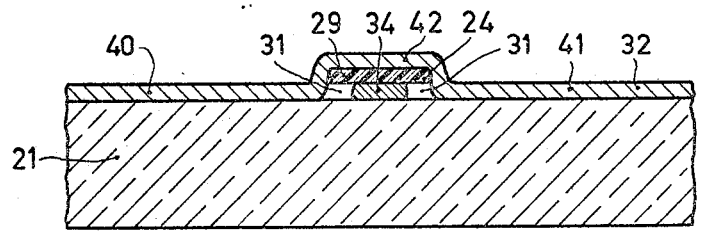
Figure 15:
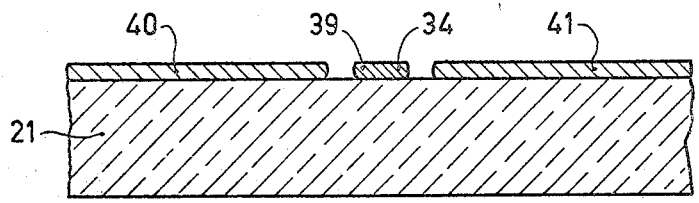
Figure 16:
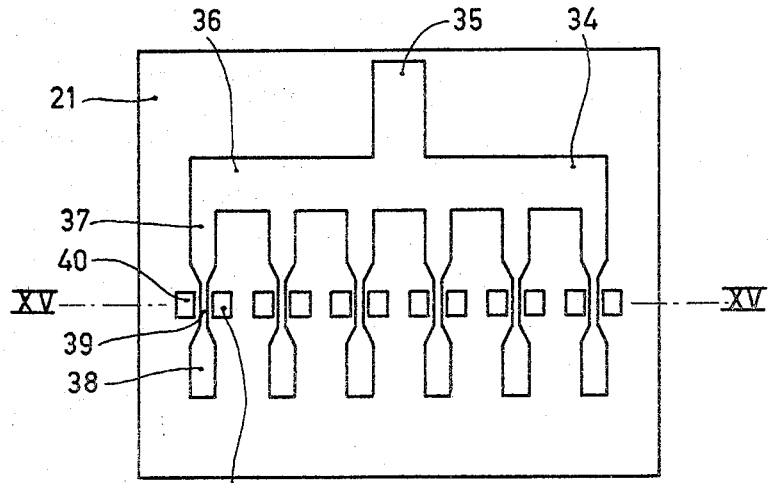
Figure 17:
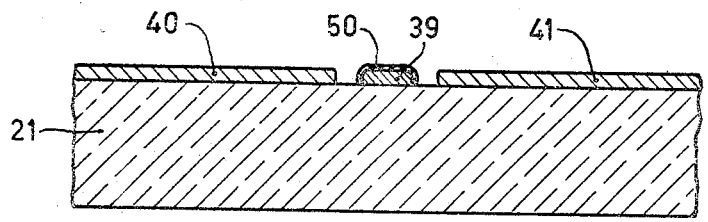
Figure 18:
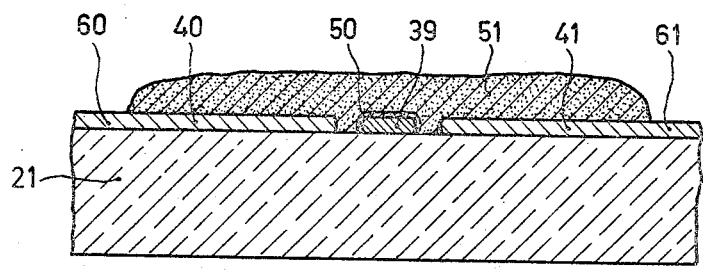
Figure 19:
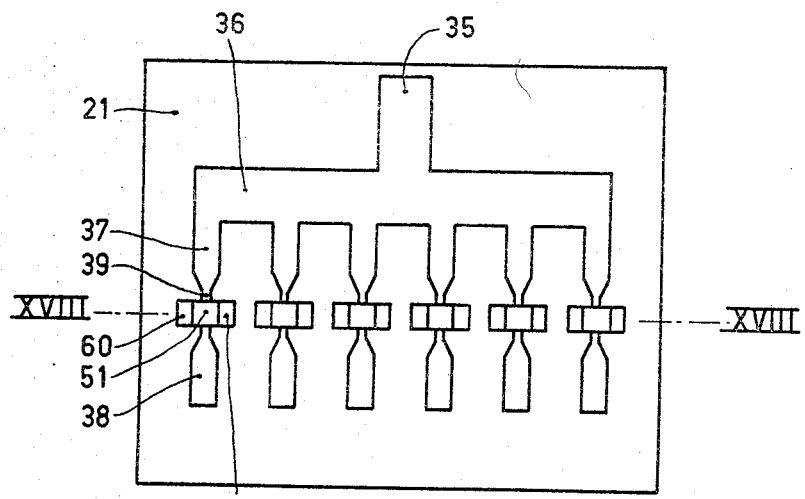

FIGURES 12, 16 and 19 show a plan view and FIGURES 9–11, 13–15, 17 and 18 show portions of a vertical cross section of a series of field-effect transistors on a common carrier plate at various stages of its manufacture, taken on the lines X—X, XV—XV and XVIII—XVIII of FIGURES 12, 16 and 19 respectively. In the vertical sections, the vertical dimensions are shown on an exaggerated scale with respect to the horizontal dimensions for the sake of clarity.

EXAMPLE I

Start is made from a monocrystal germanium body 1 of 10 mm. long, 10 mm. wide and 150 microns thick for manufacturing a plurality of transistors from this body. The body 1 consists substantially of an antimony-doped n-type material 2 having a resistivity of about 2 ohms cm. Zones of opposite conductivity types located beneath one another are formed on one side of the body 1 by diffusion of indium and arsenic, that is to say a p-type zone 3 of $1.0\mu$ thick, which is adjacent to the initial n-type material 2, and an n-type zone 4 of $0.4\mu$ thick located at the surface of the germanium body (FIGURE 1). For the formation of the said zones indium is first diffused into the body for 70 minutes at a temperature of 810° C. The resulting p-type conductive layer is then removed by etching from the under side of the body (not shown), the upper side previously being covered with an etch-proof lacquer. After the etching treatment and removal of the lacquer, arsenic is diffused for 5 minutes, the germanium body being heated to 650° C. and a flow of hydrogen saturated with arsenic vapour at 440° C. being led along the germanium body.

During this process an n-type conductive zone of reduced resistivity is also formed at the underside (not shown).

A thin silver layer 5 of approximately $0.2\mu$ thick is deposited by evaporation in vacuo onto the side of the semiconductor body 1 having the n- and p-type conductive zones 3 and 4, the semiconductor body being heated to a temperature of approximately 400° C.

After applying an etch-resistant lacquer (e.g. "Apiezon lacquer") to the under side of the body, the silver layer 5 is covered with a photo-sensitive lacquer which has the property of dissolving in a given solvent only after being illuminated. In this case use is made of the photo-sensitive lacquer which is commercially available under the name "Kalle Kopierlack." This lacquer is insoluble in dilute aqueous potassium hydroxide solution, but becomes soluble therein after illumination by ultra-violet radiation.

After its formation, the said photo-sensitive lacquer layer is locally illuminated using a photographic mask so that circular portions 6 of the photo-sensitive layer except an approximately semicircular portion 7 located within each portion 6 become soluble (FIGURE 2). The circular portions are 55 microns in diameter and the semicircular portion has a radius of approximately 17 microns. The shortest distance between the circumference of the semicircle and that of the whole circle is approximately 10 microns. The circular portions 6 are positioned in rows parallel to the length of the semiconductor body and with a spacing of 0.75 mm.

The lacquer layer is now treated with an aqueous solution of 2% by weight of KOH, thus dissolving the illuminated portions so that the silver layer 5 is exposed in situ, whereas non-illuminated portions 8 of the photo-sensitive layer remain covering the underlying silver (FIGURE 1).

Figure 3:
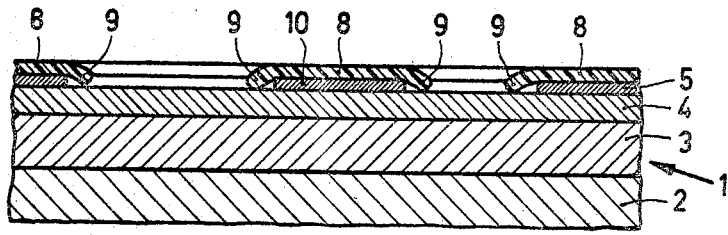

The body is now treated with nitric acid which is composed of a mixture of 2 parts by volume of concentrated nitric acid (65% by weight of $HNO_3$) and 1 part by volume of water. The duration of the etching treatment is 2 seconds. During this treatment not only the uncovered portions of the silver layer 5 are removed, but the etchant also acts from the edges of the remaining portions 8 of the lacquer layer upon the portions of the silver layer 5 located beneath the lacquer layer so that the silver layer is removed from under marginal zones 9 of the portions 8 of the lacquer layer (FIGURE 3). The width of the marginal zones 9 beneath which the silver is removed depends, of course, upon the duration of the etching treatment. With an etching treatment of 2 seconds the marginal zones 9 were found to have a width of $2\mu$ which is substantially constant throughout the edge of each portion 8. The etchant used acts only slightly upon the germanium of the body so that the two zones 3 and 4 obtained by diffusion of impurities, despite their small thickness, are not locally etched-through although the etching treatment is continued long enough to remove the silver layer beneath the masking portions 8 from the edges thereof over a width of 2 microns.

At the areas where the semicircular surface portions 7 of the photo-sensitive lacquer have initially remained unilluminated, semicircular portions 10 of the silver layer having a slightly smaller radius now subsist, said semicircular portions 10 being intended for the emitter-contact layers of the transistors to be manufactured.

To obtain a small emitter and a surrounding metallically conductive base connection to the p-type conductive zone 3 intended for the base, a second etching treatment is carried out with an etching liquid composed of a mixture of 1 part by volume of concentrated hydrofluoric acid (50% by weight of HF), 1 part by volume of hydrogen peroxide (30% by weight) and 5 parts of water. This etchant acts on the germanium, whereas its action on the silver is hardly noticeable. The latter etching treatment is carried out for so short a period that the n-type conductive zone 4 is locally removed over its total or nearly its total thickness. The duration of the etching treatment is approximately 6 sec. In this case also the portions 8 of the lacquer layer have a masking action on the underlying portions but only insofar they are still in contact with the underlying silver. However, the etchant has direct access to the germanium surface which is overshadowed by the marginal zones 9 and not covered by silver. The etchant can thus act directly upon the germanium surface from the whole surface front which is not covered by the silver.

Figure 4:
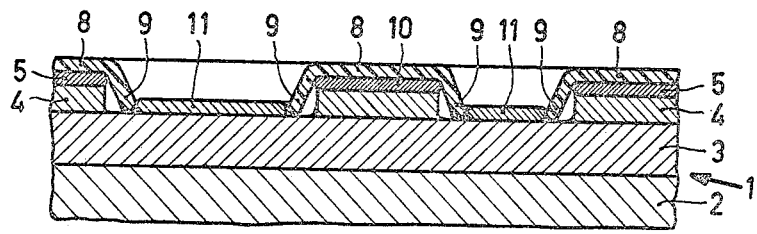

After rinsing with deionized water, drying and removal of the lacquer layer from the under side of the body 1, indium is first deposited by evaporation on the upper side of the germanium body up to a thickness of 0.04 micron and then aluminum up to a thickness of 0.4 micron, during which processes the body is not heated. Due to the shadow action of the portions 8 of the lacquer layer, the semiconductor surface is substantially covered with the indium and aluminum only at those areas which are not overshadowed by the layer portions 8 including their marginal zones 9 (FIGURE 4). It is possible that the marginal zones 9 of the thin lacquer layer flex slightly as shown in FIGURE 4, possibly as far as onto the surface portions which have been exposed after the second etching treatment and are located deeper, so that the thin metal layers 11 of aluminum and indium deposited on the semiconductor surface are defined more sharply.

After the evaporation-deposition the remaining photosensitive lacquer 8 is removed with the aid of acetone whereby any indium and aluminum deposited thereon (not shown) is released from the substrate. The whole is then heated at a temperature of approximately 635° C. for 4 minutes. The indium and the aluminum then form a molten alloy with the germanium of the substrate, the aluminum-indium-germanium melt having a penetration depth which is small relative to the thickness of the p-type conductive zone 3, any underlying residue of the in-type conductive zone 4 still being completely absorbed by the melt. The temperature used lies below the eutectic melting temperature of silver-germanium (651° C.) so that there is no risk of a silver-germanium melt being formed which might dissolve the thin n-type conductive zone 4. Due to the heating process, however, the adhesion of the silver layer to the germanium and the electric contact between the silver and the zone 4 are improved.

If the alloy melt should laterally be adjacent to the n-type conductive zone 4, the donor-concentration at this boundary is so small, that the breakdown voltage in the backward direction between the said zone and the zone recrystallized from the alloy melt after cooling is approximately 1 volt. If, however, the second etching treatment were continued so long that the n-type conductive zone 4 is locally removed up to the underlying p-type conductive zone 3, then any contact between the aluminum-containing alloy melt and the n-type conductive zone 4 is improbable since the marginal zone 9 of the photosensitive lacquer has substantially no masking action on the second etching treatment but does exert a masking action during the evaporation-deposition of the layer 11.

After cooling, satisfactorily adhering, metallically conductive contact layers with the zones 3 and 4 are formed (FIGURE 5). The portions 12 of the n-conductive zone 4 located beneath the silver contact layers 10 constitute the emitter zones and the alloyed metal layers 11 constitute the base contact layers of the transistors to be manufactured.

To reduce the capacitance of the base-collector junction of the transistors to be manufactured, the p-conductive zone 3 and its junction with the n-conductive material 2 of the body are limited to the portions located beneath the contact electrodes 11 and the emitter zones 12. To this end, as before, the under side is covered with "Apiezon lacquer" and a photosensitive lacquer layer consisting of "Kallie Kopierlack" is applied to the side of the semiconductor body 1 covered with the metallically conductive layers 5 and 11, all the surface portions except the circular portions 14, which cover the electrodes 11 and the emitters enclosed by these portions, being illuminated with ultra-violet radiation using a photographic mask, after which the illuminated portions of the lacquer are dissolved with a dilute aqueous potassium hydroxide solution (2% by weight of KOH), whereby the portions 14, which have remained unexposed, subsist.

Subsequently the body is treated with a silver etchant of the composition specified above, whereby the portions of the silver layer 5 which are not covered by the lacquer portions 14 are removed. Next, the body is treated with a solution composed of 10 parts by volume of concentrated hydrofluoric acid (50% by weight of HF), 10 parts by volume of concentrated nitric acid (65% by weight of $HNO_3$), 1 part by volume of ethyl alcohol and 15 parts of volume of water. A treatment of 3 sec. suffices to ensure that the unmasked portions of the zones 4 and 3 and the underlying portions of the pn-junction between the zone 3 and the n-conductive portion 2 of the germanium body are removed (FIGURE 6). The remaining portions 13 of the p-conductive zone 3 now constitute the base zones of the transistors.

Figure 8:
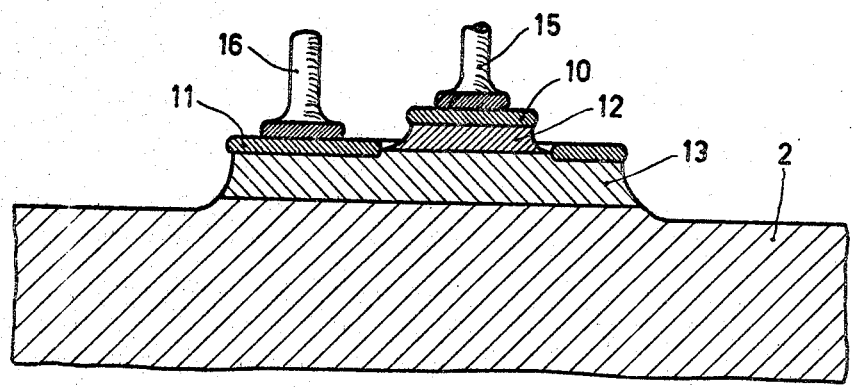
Figure 9:
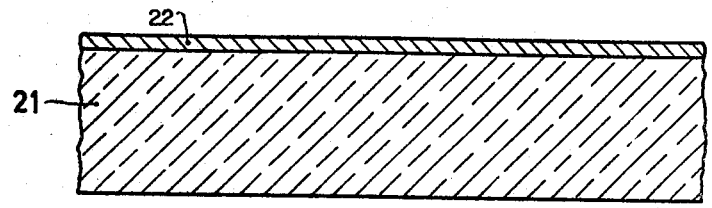

After removal of the lacquer from the upper and lower sides of the germanium body, the body is divided in known manner into separate transistors each being mounted at the collector side (not shown) on a nickel tab by gold solder. The silver contact layer 10 and the indium-aluminum contact layer 11 of each transistor are now provided with connections in the form of 7 micron thick gold wires 15 and 16, respectively, in known manner by pressure bonding (FIGURES 7 and 8).

Transistors thus manufactured have a current gain factor $\alpha'_0$ of approximately 20 for low frequencies. The capacitance of the collector at a collector voltage of 10 volts is 0.15 pf. The energy gain is approximately 12 db for signal frequencies of 800 mc./s. at a collector voltage of 10 volts and an emitter current on 2 ma.

It should be noted that there is no need for imposing extremely high requirements upon the matching of the second photographic mask to the first photographic mask. It is permissible that the electrode layer 11 is not covered with the second mask 14 up to its outer edge since the removal of a small marginal zone during the etching treatment has little influence on the properties of the transistor to be manufactured. If the second mask 14 should overlap the silver layer 5 surrounding the layer 11 (see FIGURE 5) over a thin marginal zone, this thin marginal zone is also removed due to underetching when etching among the exposed silver.

It is also to be noted that small irregularities in the shape of the first mask 8 (FIGURE 4), and hence of the emitter layer 10 are permissible since the shape of the second metallically conductive electrode layer 11 is matched to the same mask and the spacing between the two layers is constant independent of the shape of the mask.

The etching treatment for removing the n-type zone 4 as described above may in principle be carried out a little longer to ensure that locally all n-type material is removed, after which instead of indium and aluminum silver may be evaporated again, so that the metal layer applied first for forming the emitter contact and the metal layer applied afterwards for forming the base contact both will consist of silver. Silver may form ohmic contacts with low-ohmic n-type and with low ohmic p-type germanium as well. However, for certain reasons preferably a small amount of indium is evaporated just before evaporating the silver for the base contact.

EXAMPLE II

Figure 10:
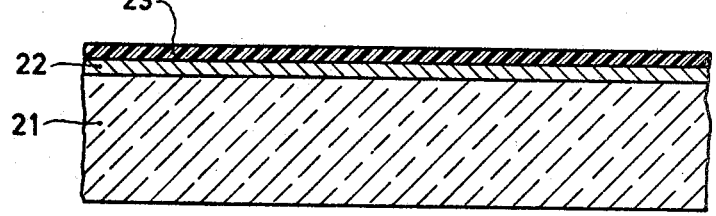
Figure 11:
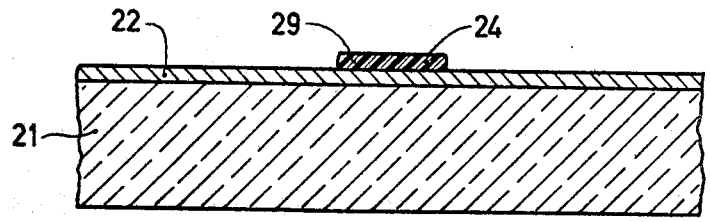
Figure 13:
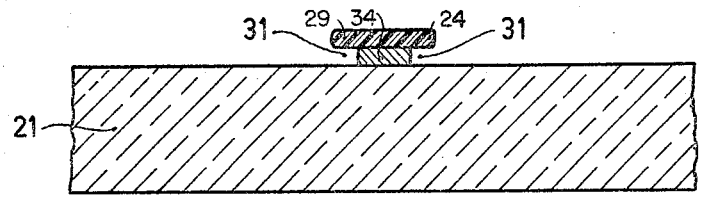

An aluminum layer 22 of approximately $0.1\mu$ thick is evaporation-deposited on one side of a glass plate 21 (FIGURE 9) and then a photo-sensitive lacquer layer 23 of approximately $1\mu$ thick is applied to the layer 22. The lacquer used in this example is again the aforementioned photo-sensitive lacquer which is available commercially under the name of "Kalle Kopierlack" (FIGURE 10). By illuminating with ultra-violet radiation with the use of a suitable optical mask and treatment with an aqueous solution of 2% by weight of KOH whereby the illuminated areas of the layer 23 are dissolved, an unexposed portion 24 (FIGURE 11) of the lacquer remains according to the pattern shown in FIGURE 12, comprising a broad strip 25 which extends to the edge of the glass plate 21, and a comb-shaped portion 26 each tooth of which comprises two broad portions 27 and 28 and an intermediate narrow strip 29. The narrow strips 29 are 2.5 mm. long and $10\mu$ wide. The exposed surface areas of the layer 22 may be affected by the treatment with the dilute caustic potash lye, but this is permissible in this case. After washing with deionised water, the whole is subjected to an etching treatment for aluminum. To this end, the plate is immersed into an aqueous solution of ortho-phosphoric acid obtained by mixing equal volumes of water and concentrated phosphoric acid (85% by weight of $H_3PO_4$). The etching treatment is carried out at room temperature (20° C.) for 60 minutes, whereafter the glass plate 21 is removed from the etching liquid and immediately rinsed with de-ionised water. Not only has the aluminum which is not covered by the masking lacquer layer 24 disappeared due to the etching treatment, but also a peripheral portion 31 of 0.5µ wide located beneath the mask 24 has been etched away from the edge of the mask so that the resulting pattern 34 of the aluminum layer is a little narrower than the pattern 24 of the photo-sensitive lacquer layer (FIGURE 13).

After drying the whole at 50° C., a second evaporation process is used during which a little chromium and then gold is evaporated up to a thickness of approximately 0.1µ. The chromium permits a more satisfactory adhesion of the gold to the glass surface. By the use of a suitable mask in the evaporation process, several relatively separated rectangular gold layers 32 of 4 mm. x 2 mm. are obtained, which extend over the narrow lacquer strips 29 (FIGURE 14). Each gold layer 32 comprises two portions 40 and 41 of substantially square shape which are adhered to the glass substrate 21, while an intermediate portion 42 is provided on the lacquer strip 22. The portions 40 and 41 are separated from the aluminum 34 by the narrow underetched gap 31.

By means of a spraying gun acetone is sprayed over the glass plate whereby the remaining lacquer layer 24 is dissolved and also the gold 42 applied thereto is removed so that only the metal applied to the glass remains (FIGURES 15 and 16). The pattern of the remaining aluminum layer 34 now comprises a strip 35 and a comb-shaped portion 36 each tooth of which comprises two broad portions 37 and 38 connected by a narrow strip 39 of 2.5 mm. long and 9µ wide. On each side of the narrow strips 39 there are situated the layer portions 40 and 41 respectively, which substantially consist of gold and each of which are separated from the intermediate strip 39 by a narrow interspace of 0.5µ wide obtained by the underetching treatment.

The aluminum is now subjected to an anodic oxidizing treatment by using an electrolyte bath composed of a solution of 7.5 g. of borax and 30 g. of boric acid per litre of water. A terminal contact is secured to the strip 35. This contact and part of the strip 35 should project above the meniscus of the liquid when immersing the glass plate in the bath. The strip 35 has previously been covered with an insulating etch-proof lacquer at the level of the meniscus of the electrolyte. Opposite that side of the glass plate immersed in the electrolyte which is provided with metal layers a platinum electrode is immersed in the electrolyte. This electrode is connected as a cathode and the aluminum layer 34 is connected as an anode, an anode voltage of 30 volts relative to the cathode being used. After approximately half an hour, the current strength has decreased to 1 µamp. The electrolytic treatment is now terminated. The glass plate is removed from the bath, rinsed with deionised water, dried, then rinsed with isopropyl alcohol and again dried. Due to the anodic treatment of the surface areas of the aluminum which have been exposed to the electrolyte an aluminum oxide layer 50 has been formed on said areas (FIGURE 17).

Next cadmium selenide (CdSe) is evaporated with the use of a suitable mask so as to form several layers 51 of this material having a square shape of 2 mm. x 2 mm. and approxiamtely 0.2µ thick, each layer 51 covering a portion of the gold layers 40 and 41 and the intermediate portion of the narrow strip 39 (FIGURES 18 and 19). During evaporation of the layer 51, the glass plate is heated to 100° C. and after said evaporation the whole is after heated at 500° C. for several minutes.

A plurality of field-effect transistors are thus formed in which the gold layers 60 and 61 constitute the input and output electrodes, respectively, and the aluminum strip 39 constitutes the gate electrode which is insulated from the semiconductor cadmium selenide by means of the aluminum-oxide layer 50. The exposed portions 60 and 61 of the gold layers 40 and 41, respectively, may be used to make electrical connections to the input and output electrodes, while the broader strip portions 37 and/or 38 may be used for electrical connection of the gate electrode. The resulting field-effect transistors are also satisfactorily usable at high frequencies of 30 to 40 mc./s., while the slope of the current-voltage characteristic is several ma. per volt at a constant voltage of 6 volts between the input and output electrodes and a variable control voltage between 1 and 7 volts at the gate electrode.

In this final example, the aluminum layer is first applied, then the etch-proof layer according to the desired pattern and then the gold. It will be evident that it is also possible first to apply the gold and cover it with an etch-proof layer of the desired pattern for forming input and output electrodes whereafter, for example, an etching treatment with a solution of KCN and $H_2O_2$ in water may be used, which etching treatment may be continued long enough for obtaining the desired extent of underetching, whereafter the aluminum may be evaporated.

Further, instead of manufacturing an insulating layer for the gate electrode by oxidation of aluminum, it is possible to form an insulating layer on the gate electrode material in a different way, for example, by evaporation, if desired prior to providing the etch-proof mask. However, the material chosen hereinbefore affords the advantage that it is possible to obtain an insulating layer between the gate electrode and the semiconductor material which is very thin but completely tight. Further it is fundamentally possible with the use of the invention to manufacture field-effect transistors in which all the electrodes are formed on the semiconductor material, provided that an insulating layer is provided between the gate electrode and the semiconductor material. It is possible, for example, first to form a cadmium-sulphide layer on a glass plate and carry out the required after-treatments, then apply gold by evaporation and cover it with an etch-proof masking layer according to the desired pattern of input and output electrodes, whereafter the gold on the unmasked surface portions is etched away with the aid of an aqueous solution of KCN and $H_2O_2$ whereby the substrate is substantially not affected, which etching treatment is continued until the desired extent of underetching, followed by evaporating the insulating material and the gate electrode material.

In the examples above described both metal layers are applied by evaporation. The method of forming the first layer is not essential to the invention and this formation may be effected in various ways, for example, by electro-deposition, by chemical deposition from a solution of a salt of the metal, comprising further a reducing agent, so-called "electroless," spraying or in any known way.

For forming the second layer it is necessary to select a method in which an effective use may be made of the shadowing action of the underetched marginal zone of the mask. In this case one is generally confined to methods of directed application such as by spraying or by evaporation. It is also possible, however, e.g. when using a thermoplastic lacquer such as the "Kalle Kopierlack" used in the previous example, prior to providing the second layer, to plasticize the lacquer by heating so that the marginal zones of the mask located clear of the surface not only flex slightly but even commence to adhere to the surface of the substrate. In the latter case the second layer may be deposited by evaporation or spraying as well as by electro-deposition or by a chemical process from a solution, the whole masking layer including its marginal zones preventing deposition on the surface portions beneath the mask.

What is claimed is:
1. A method of forming on a substrate juxtaposed first and second layers separated by a narrow gap, comprising the steps of depositing a first layer on said substrate, forming over at least part of said first layer an etch-resistant material having a pattern exposing at least a portion of said first layer, etching away the exposed portion of said first layer and an adjacent marginal strip extending underneath the etch-resistant material, and then depositing on the substrate the second layer to at least overlap the etch-resistant material and underetched strip, whereby the first and second layers become spaced along the substrate by the width of the etch-resistant material overlying the underetched strip.

2. A method of forming on a substrate juxtaposed, substantially coplanar, first and second metal layers separated by a narrow gap, comprising the steps of depositing a first metal layer on said substrate, forming over at least part of said first layer an etch-resistant material having a pattern exposing at least a portion of said first layer, etching away the exposed portion of said first layer and an adjacent marginal strip extending underneath the etch-resistant material to exposed the substrate using an etchant which attacks the substrate to a much smaller degree than the first layer, and then, while the same said etch-resistant material remains in place, depositing on the exposed substrate surface the second metal layer to at least overlay the said etch-resistant material and underetched strip, whereby the first and second metal layers become spaced along the substrate by the width of the etch-resistant material overlying the underetched strip.

3. A method as set forth in claim 2 wherein the substrate is of an electrically insulating material.

4. A method as set forth in claim 3 wherein the portion of the substrate covered by the metal layers is optically transparent.

5. A method as set forth in claim 3 wherein, after provision of the metal layers, a semiconductive material is provided over the layers to bridge the narrow gap.

6. A method of forming on a semiconductive substrate juxtaposed first and second metal layer connections separated by a narrow gap, comprising the steps of depositing a first metal layer connection on said semiconductive substrate, forming over at least part of said first layer an etch-resistant material having a pattern exposing at least a portion of said first layer, etching away the exposed portion of said first layer and an adjacent marginal strip extending underneath the etch-resistant material to expose the substrate surface using an etchant which attacks the substrate to a much smaller degree than the first layer, and then, while the same said etch-resistant material remains in place, depositing on the exposed substrate surface the second metal layer connection to at least overlap the same said etch-resistant material and underetched strip, whereby the first and second metal layer connections become spaced along the substrate by the width of the etch-resistant material overlying the underetched strip.

7. A method as set forth in claim 6 wherein, before depositing the first layer, a first thin surface region of the substrate is converted to a conductivity type opposite to that of the underlying substrate portion, the metal layers being deposited on the said converted first surface region.

8. A method as set forth in claim 6 wherein the two metal layers have different compositions forming, respectively, ohmic and rectifying connections to the semiconductive substrate.

9. A method as set forth in claim 7 wherein a second thin surface region of the first surface region is converted to a conductivity type the same as that of the said underlying substrate portion, one of said metal layers being deposited on said second surface region, the other of said metal layers being deposited on said first surface region.

10. A method as set forth in claim 7 wherein after the etching away of the first metal layer, the exposed first surface region of the substrate is subjected to a second etching treatment to remove the exposed portion of same, following which the second metal layer is deposited from the vapor phase.

11. A method as set forth in claim 8 wherein the semiconductor is silicon or germanium, and at least one of the deposited metal layers is aluminum or silver.

12. The method of providing a pair of electrode connections spaced apart ten microns or less on a semiconductive wafer comprising the steps of depositing a first metallic coating on said wafer for forming a first electrode connection to the wafer, depositing an insulating layer over at least a portion of said layer, forming an opening in said insulating layer for exposing a portion of said metallic coating, etching the exposed portion of said coating for exposing the semiconductive wafer and for undercutting a portion of the surface of the insulating layer around the perimeter of the opening a distance of ten microns or less, depositing a second metallic coating extending over the opening in the insulating layer for forming a second electrode connection to the wafer spaced from the first electrode connection substantially by the amount of said undercutting.

References Cited

UNITED STATES PATENTS

| | | | |
|---|---|---|---|
| 3,244,555 | 4/1966 | Adam et al. | 117—212 |
| 3,303,071 | 2/1967 | Kocsis | 148—187 |

ALFRED L. LEAVITT, Primary Examiner

A. GRIMALDI, Assistant Examiner

U.S. Cl. X.R.

117—217; 148—187; 156—8, 17; 317—234